Patented Jan. 26, 1937

2,069,185

UNITED STATES PATENT OFFICE 2,069,185

MANUFACTURE OF VANILLIN FROM WASTE SULPHITE PULP LIQUOR

Harold Hibbert, Montreal, Quebec, and George H. Tomlinson, Jr., Westmount, Quebec, Canada, assignors to Howard Smith Chemicals Limited, Montreal, Quebec, Canada, a corporation of Canada No Drawing. Application December 27, 1934, Serial No. 759,430

10 Claims. (Cl. 260—137)

This invention relates to the manufacture of vanillin from waste sulphite pulp liquor and related substances containing lignin sulphonic acids by a process wherein the vanillin is intially formed by the action of hot alkali on the lignin sulphonic acids; is then liberated from its alkaline solution by carbon dioxide; and is then isolated by extraction with a suitable solvent. The vanillin thus obtained is easily separated from the solvent and purified by well known methods. Another important feature is that, when carbonic acid is used, the waste alkali contained in the mother liquor from which the vanillin has been extracted is recoverable in a form suitable for re-use. By this process it is possible to obtain a considerable yield of vanillin along with sufficient recovery of valuable chemicals to permit of profitable operation of the process on a commercial scale.

In the practice of this invention the initial formation of vanillin may be accomplished by evaporating the waste liquor to a suitable concentration and then heating it in the presence of an excess of sodium hydroxide. The mixture may be heated to boiling at atmospheric pressure or to around 125° C. to around 160° C. under superatmospheric pressure. The vanillin is thus obtained in the form of its alkaline salt from which the vanillin is then liberated by treatment of the alkaline reaction liquor with an excess of carbon dioxide. The freed vanillin is then isolated by extraction with a suitable solvent such as benzene or ethylene chloride. The vanillin is then separated from the organic solvent and purified by steam distillation, crystallization, sublimation or other well known methods. The mother liquor, from which the vanillin has been extracted, now contains the waste alkali principally in the form of alkaline bicarbonate along with lignin and calcium salts, such as calcium sulphate and calcium sulphite. This residual liquor is treated to remove the insoluble calcium salts and then dried and incinerated to recover sodium carbonate which is causticized for re-use in the process. It will thus be seen that the process readily lends itself to the recovery of the waste alkali in connection with the manufacture of soda pulp. It is obvious that the organic solvent can also be recovered for re-use.

The process as outlined above is subject to various modifications. A solution of caustic soda may be added to dilute waste sulphite liquor as obtained from the manufacture of sulphite pulp and the mixture then evaporated to a suitable concentration. In place of caustic soda we may use other metallic hydroxides, such as potassium hydroxide or barium hydroxide. Other factors, such as the time; the concentration of the alkali; the specific gravity of the waste liquor; and the temperature may also be varied within wide limits as illustrated by the following examples:

Example 1.—We take 1 litre of sulphite liquor having a specific gravity of 1.050 and mix this with 120 grams of solid caustic soda. The alkaline liquor is then heated for 2½ hours under pressure, at a temperature of 160° C., the reaction mixture allowed to cool, and the vanillin formed in the reaction then liberated from its sodium salt by subjecting the liquor to an excess of carbon dioxide. The vanillin thus liberated is extracted by shaking the reaction product with benzene. The benzene containing the vanillin is then separated from the aqueous solution. The benzene is distilled off and the vanillin thus obtained is purified. The amount of pure vanillin contained in the residual benzene extract is approximately 2.8 grams. The mother liquor from which the vanillin has been extracted contains waste chemicals in a form recoverable by the methods previously described.

Example 2.—A sulphite liquor having a specific gravity of 1.050 was mixed with a sufficient quantity of caustic soda to give an alkaline concentration of 24% and the resulting liquor refluxed for twelve hours. The vanillin formed was recovered in the manner outlined in Example 1. In this case a yield of vanillin amounting to 2.7 grams per litre of liquor was obtained.

Example 3.—A sulphite liquor having a specific gravity of 1.050 was mixed with a sufficient quantity of caustic soda to give an alkaline concentration of 12% and the resulting liquor cooked under pressure for six hours at 125° C. The vanillin formed was recovered in the manner outlined in Example 1. In this case a yield of vanillin amounting to 2.7 grams per litre of liquor was obtained.

Example 4.—A portion of waste sulphite liquor having a specific gravity of 1.050 was first concentrated to one-half its original volume. This concentrated liquor was then mixed with a sufficient quantity of caustic soda to give an alkaline concentration of 12% and the resulting mixture cooked under pressure for six hours at 125° C. The vanillin formed was recovered as outlined in Example 1. In this case a yield of vanillin amounting to 4.7 grams per litre of liquor was obtained.

Having thus described the principle of our invention, along with certain specific examples, it is understood that we reserve the right to all desirable modifications falling within the scope and spirit of the appended claims. Instead of starting with waste sulphite pulp liquor it is also possible to start with wood and make the sulphite liquor as a primary product for subsequent treatment in accordance with the process of this invention.

Having thus described our invention, what we claim is:—

1. A process for obtaining vanillin from liquor containing lignin sulphonic acids which comprises subjecting the liquor to the action of hot caustic alkali and subjecting the resulting alkaline reaction liquid to the action of carbon dioxide to liberate the previously formed vanillin.

2. A process for obtaining vanillin from waste sulphite liquor which comprises subjecting the liquor to the action of hot caustic alkali and subjecting the resulting alkaline reaction liquid to the action of carbon dioxide to liberate the previously formed vanillin.

3. A process for obtaining vanillin from waste sulphite liquor which comprises subjecting the liquor to the action of hot caustic alkali by boiling the liquor and alkali together for several hours, subjecting the resulting alkaline reaction liquid to the action of carbon dioxide to liberate the previously formed vanillin and then extracting the vanillin.

4. A process for obtaining vanillin from waste sulphite liquor which comprises subjecting the liquor to the action of hot caustic alkali by heating to around 125° C. to 160° C. for several hours, subjecting the resulting alkaline reaction liquid to the action of carbon dioxide to liberate the previously formed vanillin and then extracting the vanillin.

5. A process for obtaining vanillin from waste sulphite liquor which comprises subjecting the liquor to the action of hot caustic alkali, subjecting the resulting alkaline reaction liquid to the action of carbon dioxide to liberate the previously formed vanillin and then extracting the vanillin with a water immiscible solvent.

6. A process as claimed in claim 5 in which the caustic alkali employed is sodium hydroxide.

7. A process as claimed in claim 5 in which the vanillin is extracted with the aid of benzene.

8. A process as claimed in claim 5 in which the vanillin is extracted with the aid of ethylene chloride.

9. A process as claimed in claim 5 in which the vanillin is extracted with the aid of benzene and the benzene then recovered.

10. A process as claimed in claim 5 in which the waste liquor is concentrated by evaporation before being subjected to the action of the caustic alkali.

HAROLD HIBBERT.
GEORGE H. TOMLINSON, Jr.